Jan. 13, 1959     T. O. KOSATKA     2,868,566
CARTRIDGE TYPE SEAL FOR ROTARY SHAFTS
Filed April 1, 1955
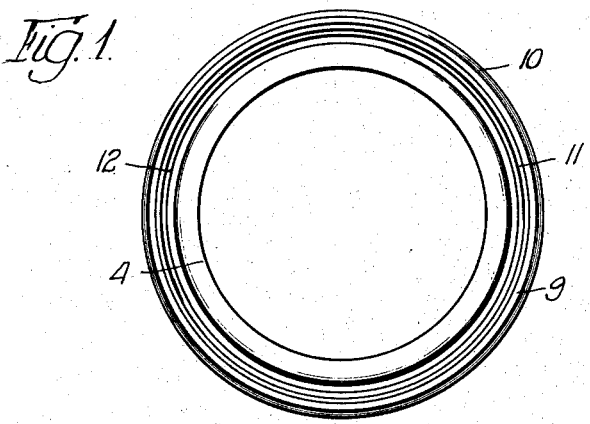
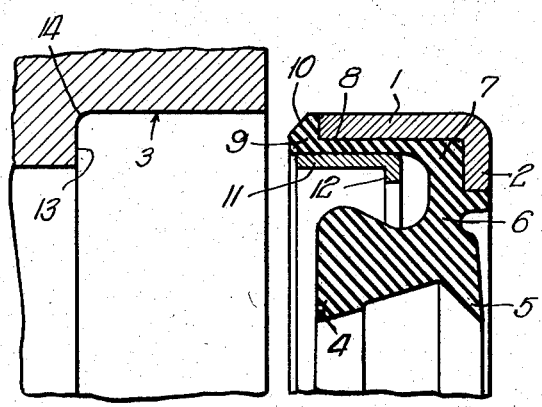
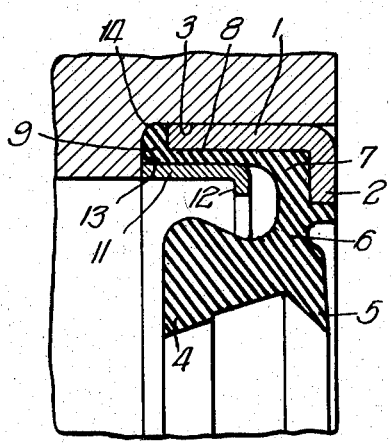
INVENTOR.
Thomas O. Kosatka,

# United States Patent Office 2,868,566
Patented Jan. 13, 1959

2,868,566

CARTRIDGE TYPE SEAL FOR ROTARY SHAFTS

Thomas O. Kosatka, Chicago, Ill., assignor to Victor Manufacturing & Gasket Co., Chicago, Ill., a corporation of Illinois Application April 1, 1955, Serial No. 498,677

1 Claim. (Cl. 286—7)

This invention relates to devices for forming a fluid tight seal between a shaft and a bore in a housing through which the shaft projects.

It is a main object of the invention to provide in a self-contained metal encased sealing device an improved arrangement for forming a fluid tight seal between the sealing device and the bore in which it is positioned.

Another object of the invention is to provide a means for forming a seal between the sealing device and the bore in which it is positioned, which seal will remain fluid tight against fluids at high temperature and under high pressure.

Further objects of the invention not specifically mentioned here will be apparent from the detailed description and claims which follow, reference being had to the accompanying drawings in which a preferred embodiment of the invention is shown by way of example and in which:

Fig. 1 is a plan view of the sealing device;

Fig. 2 is a fragmentary cross sectional view drawn to an enlarged scale and showing the device prior to insertion in the bore; and Fig. 3 is a view similar to Fig. 2, showing the sealing device inserted in the bore.

Sealing devices for forming a fluid tight seal between a rotating shaft and a bore in the housing through which the shaft projects are old in the prior art of which I am aware. Certain of these prior art devices are self-contained in a metallic casing or shell, the outer diameter of which is accurately ground to press fit in the bore in the housing, the tight engagement of the shell and bore being relied upon to form a seal at this point.

In certain installations where fluids, such as oil, are under relatively high temperatures and pressure, this metal-to-metal seal has been found to be insufficient to maintain fluid tightness over a long period of time. In other instances, the outer surface of the shell of the sealing device has been coated with an elastomer which is compressed between the shell and the bore to form a fluid tight seal therebetween. Such an arrangement, while eminently satisfactory where low temperatures are involved, has failed in sealing high temperature fluids because of the tendency of elastomers capable of withstanding these temperatures to become soft and flabby under the influence of heat and the oils with which they come in contact.

The present invention seeks to provide a fluid seal capable of maintaining fluid tight seal between the device and the bore against fluids such as oil at high temperature and pressure.

In its preferred form, the sealing device of the present invention consists of a cuplike metal shell, the outer diameter of which is ground to form a press fit with the bore. An elastomer is bonded to the inner surface of the shell and has a sealing lip means projecting inwardly therefrom to form a fluid tight seal with the shaft. The elastomer bonded to the inner surface of the outer wall of the shell extends across the end of that wall and is compressed by engagement with a shoulder in the bore as the seal is forced therein. A reinforced metal ring is press-fitted into the sealing device, having engagement with the wall of elastomer, which ring also engages the shoulder of the bore and confines that portion of the elastomer that overlaps the end of the metallic shell, so that even though that elastomer be softened by contact with oils at high temperature it will maintain a fluid tight seal since it is completely encased.

The invention will best be understood by reference to the accompanying drawings. The seal comprises a metallic shell having an outer cylindrical wall 1 and a short flat wall 2 extending radially inwardly from one end of the cyindrical wall. The outer surface of the cylindrical wall is accurately maintained to size to form a press fit with the cylindrical wall 3 of the bore.

In the device shown by way of example, the elastomer sealing means comprises a sealing lip 4 adapted to engage a shaft and form a seal therewith to prevent escape of the fluid in the housing, and a second lip 5 adapted to engage the shaft to prevent entry of dust and other contaminants into the housing, which lips are connected by a neck portion 6 to a base 7 which is bonded to the inner face of the shell portions 1 and 2. A single lip sealing arrangement may be substituted for the one shown, if desired.

The cylindrical wall 8 of elastomer extends to and beyond the open end of the shell portion 1 and contains a washerlike extension 9 that projects across the end of the shell portion 1 and is bonded thereto. The portion 9 is chamfered, as shown at 10, to prevent damage to it as it is being inserted in the bore.

Fitted within the sealing device and bearing against the elastomer wall 8 is a metallic ring 11 which is flanged at 12 to stiffen it. The metallic ring 11 is not bonded to the elastomer and may be positioned with its outer end flush with the washer portion 9 of the elastomer, if desired.

In addition to the cylindrical wall 3, the bore contains a shoulder 13 usually connected to the cylindrical wall 3 by a radius portion or fillet 14.

As the seal is inserted in the bore, chamfer 10 serves as a lead-in ring permitting insertion of the seal without damage to the washer portion 9. The seal is forced inwardly in the bore to move the sealing washer 9 and reinforcing ring 11 into engagement with the shoulder 13 in the bore. As the washer 9 is compressed by continued movement of the shell cylinder 1 inwardly in the bore, ring 11 is pushed inwardly into the sealing device, sliding on the elastomer wall 8. When the seal is completely inserted in the bore, the sealing washer 9 is compressed between the bore and shoulder thereof, the ring 11 and the outer wall 1 of the shell. Any tendency of the fillet 14 in the bore to strip the sealing washer 9 from the shell 1 is resisted by the reinforcing ring 11.

With the seal thus inserted in the bore, it is held by frictional engagement between the cylindrical surface 3 of the bore and the cylindrical wall 1 of the shell. The sealing washer 9 being completely encased maintains a fluid tight seal even though the material of which it is composed has a tendency to soften and become flabby when exposed to oil at high temperature.

In forming a seal between the shaft and housing of an automatic transmission in which oil must be confined, notwithstanding that it is at high temperature and under considerable pressure, the sealing device of the present invention with the elastomer consisting of a silicone composition has been found to maintain fluid tight seal in a satisfactory manner over a long period of time. While silicone is preferred for an installation of this kind, the teachings of the present invention may equally well be applied to other elastomers best suited to meet existing conditions.

While I have illustrated my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claim.

I claim:

Means for forming and maintaining a fluid tight seal against fluid pressure at such a temperature as to require the use of silicone rubber, comprising the combination of a machine member having an opening through which a shaft projects, which opening is defined by an outer cylindrical surface, a radial surface extending inwardly from one end of said outer surface and a fillet joining said cylindrical and radial surfaces; a metallic shell having a cylindrical wall dimensioned for press fit engagement with said cylindrical surface and a radial wall extending inwardly from one end of said cylindrical wall; a sealing lip composed of a silicone rubber; a base portion of said sealing lip bonded to and covering the inner face of the cylindrical wall of the shell and extending across and bonded to the end of said cylindrical wall that is remote from said radial wall, said base portion also covering the inner face of the radial wall and being bonded thereto; and a flanged metallic ring slidably engaging the inner surface of the base portion of the elastomer that covers the inner surface of the cylindrical wall of the shell and engaging said radial surface of the machine member, said ring confining that portion of the elastomer bonded to the end of the cylindrical wall of the shell in the space between that end, the ring, the radial and cylindrical surfaces and the fillet of the machine member to form a seal between the member and shell and to maintain that seal even though the elastomer be softened by heated fluid in contact therewith.

References Cited in the file of this patent

UNITED STATES PATENTS

| | | |
|---|---|---|
| 2,093,572 | Padgett | Sept. 21, 1937 |
| 2,434,686 | Clayton-Wright | Jan. 20, 1948 |
| 2,635,907 | Heimbuch | Apr. 21, 1953 |

FOREIGN PATENTS

| | | |
|---|---|---|
| 479,743 | Great Britain | Feb. 10, 1938 |
| 556,441 | Great Britain | Oct. 5, 1943 |
| 623,835 | Great Britain | May 24, 1949 |
| 724,341 | Great Britain | Feb. 16, 1955 |
| 741,566 | Germany | Nov. 12, 1943 |
| 866,585 | Germany | Mar 5, 1953 |